United States Patent

[11] 3,615,859

| [72] | Inventor | Brooke Schumm, Jr. |
| --- | --- | --- |
| | | Bay Village, Ohio |
| [21] | Appl. No. | 830,657 |
| [22] | Filed | June 5, 1969 |
| [45] | Patented | Oct. 26, 1971 |
| [73] | Assignee | Union Carbide Corporation |
| | | New York, N.Y. |

[54] LECLANCHE DRY CELL WITH THICK WALL PASTE SEPARATOR
3 Claims, 3 Drawing Figs.

[52] U.S. Cl. .................................................. 136/107, 136/131
[51] Int. Cl. .................................................. H01m 21/00
[50] Field of Search .................................... 136/107, 131, 132, 83, 95, 157, 158, 163, 146, 111, 123, 124, 147,

[56] References Cited
UNITED STATES PATENTS

| 1,408,525 | 3/1922 | Loveman | 136/157 X |
| --- | --- | --- | --- |
| 1,430,727 | 10/1922 | DeOlaneta | 136/95 X |
| 1,506,217 | 8/1924 | Benner et al. | 136/107 X |
| 2,034,817 | 3/1936 | Johnson | 136/131 |
| 2,620,368 | 12/1952 | Ruben | 136/107 |
| 2,904,615 | 9/1959 | Hatfield | 136/146 |
| 2,923,757 | 2/1960 | Klopp | 136/107 |
| 3,041,114 | 6/1962 | Huber | 136/83 |
| 3,345,215 | 10/1967 | Ryhiner et al. | 136/146 |

FOREIGN PATENTS

| 868,938 | 9/1950 | Germany | | |
| --- | --- | --- | --- | --- |

*Primary Examiner*—Winston A. Douglas
*Assistant Examiner*—A. Skapars
*Attorneys*—Paul A. Rose, John F. Hohmann and John R. Doherty

ABSTRACT: A substantial reduction in the formation and movement of spew in a Leclanche dry cell is obtained by the provision of a thick wall gelatinous electrolyte past separator interposed between the consumable zinc anode and the cathode mix cake without seriously reducing the service life of the cell.

PATENTED OCT 26 1971

INVENTOR
BROOKE SCHUMM, JR.

ATTORNEY

LECLANCHE DRY CELL WITH THICK WALL PASTE SEPARATOR

The present invention relates generally to Leclanche dry cells, of the cylindrical or round type customarily used in flashlights and the like. More particularly, the invention relates to Leclanche dry cells of the type utilizing a gelatinous electrolyte paste as the separator medium.

Leclanche dry cells may be basically defined as including a consumable zinc anode, a cathode mix cake consisting essentially of a mixture of manganese dioxide as the active depolarizer material, a conductive material such as graphite or carbon black and electrolyte, and a separator medium interposed between the anode and cathode and containing the balance of the electrolyte. The separator medium is usually a gelled paste which may be composed essentially of electrolyte, corn starch and flour, for example, and may also be a film or thin bibulous paper treated with a paste composition, containing the electrolyte. The electrolyte for the dry cell is an aqueous solution of ammonium chloride and zinc chloride and may contain small amounts of various inhibitors such as mercuric chloride as well known to those skilled in the art.

In the more familiar cylindrical or round type of Leclanche dry cell customarily used in flashlights and the like, the anode usually consists of a zinc cup or can which often serves as the principal container for the cell elements. The cathode mix cake is molded around a central carbon electrode to form a cylindrical bobbin. The bobbin resides in the zinc cup or can and is separated therefrom by the gelatinous electrolyte paste forming the separator medium.

Since these dry cells tend to generate and expel a liquidous product often referred to as "spew" particularly on overdischarge, it is customary to encase the cell proper within an outer container of one sort or another in an effort to accommodate the spew and to prevent the spew which is highly corrosive from coming into contact with the flashlight or other instrument in which the cell is used. Another serious problem resides in the fact that these cells often generate copious quantities of gas on overdischarge which if not properly vented could give rise to the buildup of dangerous internal pressure inside the cell. Thus, it is usually the practice to provide some sort of venting means in the structure of the outer cell container. Usually the carbon electrode is porous and serves as an internal venting path within the cell. Unfortunately, the pores of the carbon electrode sometimes are blocked by the spew and consequently either the internal gas pressure builds up to a dangerous level or the spew is forced with the gas into and through the venting means in the outer cell container thereby causing leakage.

Considerable effort has been expanded over the past three decades or more in an attempt to generally improve the performance of the Leclanche dry cell. These efforts have been mainly directed to the improvement of the leakage resistant characteristics of the dry cells and also to the problem of providing maximum service life from the cells at a relatively low cost. Thus, it has been proposed to modify the structure of the outer cell container in various ways in order to make the container stronger and less apt to leak, and by providing superior venting electrodes and gas vents. Various proposals have also been made for improving the service life of the dry cells and probably the most notable in recent years has been the contribution of the pasted thin paper or film separator. The use of these thin separators in place of the gelatinous electrolyte paste has made it possible to employ more cathode material for any fixed volume in a particular size cell.

It has been recognized for many years now by those skilled in the art that if the formation and movement of the spew could be substantially reduced or eliminated, the dry cell would be much less apt to leak. Despite past research studies concerned with the various aspects of the cell reaction, no practical means has been developed for reducing the amount of spew formed within the dry cell while at the same time maintaining a high level of service. Consequently resort has been taken mainly to improving the structure of the outer cell container with a view towards accommodating the spew and preventing its leakage from the cell.

It is therefore a general object of the present invention to significantly improve the leakage resistance of a Leclanche dry cell.

More specifically, another object of the present invention is to significantly improve the leakage resistance of a Leclanche dry cell by internally controlling the formation and movement of spew within the region where it is normally formed rather than accommodating the spew generated on discharge of the dry cell.

Still another object of the present invention is to substantially reduce the formation and movement of spew without at the same time significantly reducing the service life of the dry cell.

These and other related objects and advantages are accomplished in accordance with the invention by the provision in a Leclanche dry cell of a gelatinous electrolyte paste separator having a size or thickness which is considerably greater than that of conventional paste separators heretofore used in dry cells of the prior art.

Basically, the invention is predicated on the discovery that if, contrary to previous practice, the gelatinous electrolyte paste separator wall thickness is significantly increased, the formation of spew can be substantially reduced without seriously reducing the service life as heretofore thought by those skilled in the art. It has been found that the use of a thick wall paste separator brings about a distinct change in the character and location of the by-products of the cell reaction while at the same time increasing the electrical efficiency of the cell.

Typical of the practice of the present invention, D-size Leclanche round dry cells are provided with a gelatinous electrolyte paste separator having a wall thickness of about 0.125 inch or more whereas prior dry cells of the same size employed a paste wall thickness of between about 0.06 to 0.09 inch. In further contrast, other D-size round dry cells of the prior art have employed thin paper or film separators having a thickness of only about 0.005 inch.

The novel features, aims and advantages of the present invention will now be more particularly described in the following detailed description taken in conjunction with the accompanying drawing, wherein FIG. 1 is a sectional view of a Leclanche dry cell embodying the invention;

Figure 1:
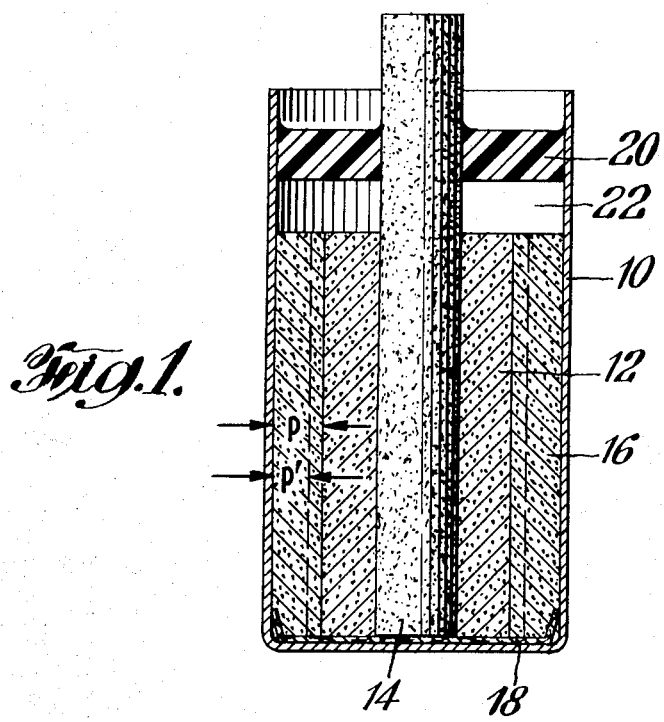

Referring now to FIG. 1, there is shown a Leclanche cylindrical or round dry cell comprising the conventional zinc cup or can 10 containing the cathode mix cake 12 molded around the central carbon electrode rod 14 in the form of a bobbin. The cathode mix cake 12 contains part of the cell electrolyte and the usual mixture of manganese dioxide and graphite or some form of carbon black, with the conventional addition of solid ammonium chloride. Separating the cathode bobbin from the sidewalls of the zinc cup or can 10 is a homogeneous gelatinous electrolyte paste separator 16. The paste separator 16 may consist of the usual mixture of about two parts of corn starch and one part flour made into a gelatinous paste with the balance of the cell electrolyte. An insulating member 18 such as a paper or cardboard washer is placed below the cathode bobbin within the bottom end of the zinc cup or can 10.

As shown in FIG. 1, the dry cell may be closed using a conventional insulating washer 20 which surrounds the carbon electrode rod 14 within the upper open end of the zinc cup or can 10. The insulating washer 20 is positioned a short distance above the cathode bobbin in order to provide an "air space" within the top of the cell as indicated at 22. For illustrative purposes, the cell has been shown in FIG. 1 with only the basic elements of its construction and it will be understood that in actual practice the cell may incorporate any one of various types of outer container structures as will readily occur to those skilled in the art.

In accordance with the present invention, the gelatinous electrolyte paste separator 16 is formed with a wall thickness which is at least 25 percent greater than that of conventional paste separators used in the prior art. This is depicted schematically but by no means to actual scale in FIG. 1 wherein $p$ represents the wall thickness of the paste separator 16 of the invention and $p'$ represents the limit of paste wall thickness in prior art dry cells.

During the course of experimentation leading to the present invention, it was unexpectedly found that by increasing the paste wall thickness at the expense of bobbin diameter not only was there a substantial reduction in the formation of spew but also a significant change in the appearance and structure of the solid precipitate which normally forms within the interstices and on the surface of the cathode bobbin during the late stages of discharge of the dry cell. Normally this solid precipitate in prior dry cells consists of a dense, semicrystalline, hard crust or layer which adheres firmly to the surface of the cathode bobbin. Under the same test conditions, in the present dry cell utilizing a thick wall paste separator, the appearance and structure of the solid precipitate was changed to a relatively soft, porous, loosely adherent crust or layer which could be easily broken off from the surface of the cathode bobbin.

In order to fully understand the concept of thick wall paste separator and the significant changes brought about internally within a dry cell, a study is necessary of the theory of ion movement and the subsequent reactions and their effects which take place throughout the cell electrolyte on discharge. It is found that basically two phases of cell deterioration exist which contribute to cell leakage. Phase I occurs during and after discharge wherein ion movement takes place in the cell in such manner as to increase the amount of electrolyte and chemical reaction products in the paste separator. This mixture of electrolyte and chemical reaction products i.e. spew, flows into any accessible open spaces about the separator. Phase II occurs for the most part after discharge of the cell wherein the principal and secondary chemical depolarizing and equilibrium-seeking reactions cause gas pressure to build up primarily within the region of the cathode bobbin. This pressure is often not relieved because of blocking of the pores of the cathode and the venting electrode or any other vents by the spew from Phase I.

Although the two phases contributing to cell leakage are not completely separable, they will be treated independently so far as possible for purposes of this discussion. Phase I includes the useful life of the cell. During and after this useful life, each electrode behaves as follows:

Anode

As electrons are drawn from the zinc atoms on discharge, the zinc on the anode surface ionizes and immediately combines with ions in the electrolyte to produce a large soluble zinc tetrachloride or a zinc chloride-hydroxide anion with a double negative charge. Since the chloride or hydroxide ions had been previously associated with either hydrogen or ammonium ion, the solution within the region of the anode becomes acid from the residual excess of these latter ions.

Cathode

As electrons are conducted to the manganese dioxide cathode, chemical reaction takes hydrogen ion from the electrolyte. This hydrogen ion is taken from (a) excess hydrogen ions present due to zinc chloride and zinc chloride-hydroxide complexes in the electrolyte (b) ammonium ion ($NH_4^+$) in the electrolyte and (c) water in the electrolyte. The net effect is to cause the electrolyte in the vicinity of the cathode to become alkaline and supersaturated with ammonia.

These adjacent acid and base forming electrode reactions involve manganese dioxide, zinc ion complexes, hydrogen ion, hydroxyl ion, ammonium ion, chloride ion and water. It will be appreciated that in a system which is this complicated a variety of reaction products can be formed.

The electrochemically active portions of the cell can be divided into essentially three regions, namely (a) the anode region, i.e. that portion of the paste separator adjacent to the anode (b) the cathode mix and (c) the remaining portion of the paste separator.

During Phase I it is believed that the following effects take place in each of these regions.

A. Anode Region. On heavy electrical drain this region becomes very acid because the zinc chloride and chloride-hydroxide ion complexes diffuse slowly.

B. Cathode Mix Cake. As the hydrogen ions react with manganese dioxide this region becomes more alkaline. Residual ammonia separates as a gas or reacts with the zinc chloride complex to form a precipitate which may block gaseous and liquid diffusion in the cathode mix. Residual hydroxide ions may also precipitate zinc salts which may similarly block gaseous and liquid diffusion in the cathode mix.

C. Separator. As the zinc chloride and chloride-hydroxide ions from the anode enter the electrolyte solution abundant in the cathode products, the zinc salts of ammonia, hydroxyl and chloride ion are precipitated. In prior dry cells this precipitation almost invariably occurs in the interstices of the depolarizing cathode bobbin and creates a diffusion barrier. The soluble zinc salt complexes diffuse too slowly to pass through this barrier while the faster moving alkaline ions are less affected. Thus a dense, semicrystalline hard crust or layer forms within the bobbin near the surfaces closest to the anode and tends to build out toward the anode and into the paste separator.

The continuing formation of this crust or layer contributes to at least three significant events: (a) mingling of the electrode products is progressively decreased by a reduction of the size and number of ion diffusion paths which moreover reduces the rate of diffusion of anodic ions proportionately greater than the rate of diffusion of the cathodic ions; (b) the consequent increase in soluble zinc chloride and chloride-hydroxide salt concentration causes the anode region to become so acid that the paste gel holding the electrolyte partially collapses leaving a less viscous slurry of acidic solution and (c) the continued diffusion, however slow, of cathode ions into the separator creates pressure tending to push the acid slurry out of the regions under discussion. This displaced liquid is termed "spew."

Phase I contributing to cell leakage by the formation and movement of spew is not completed until all of the zinc anode is dissolved. However, the greater portion of spew movement normally occurs during and shortly after the useful life of the cell has been exhausted.

All of the activity of Phase II contributing to leakage due to the formation of gas normally occurs after the useful life of the cell. Most of the buildup of gaseous reaction products takes place within the cathode bobbin. The carbon electrode may be porous and in such case is intended to provide a venting path for the gas. Unfortunately, if the bobbin structure is clogged with the cell reaction products, at least some gas pressure is exerted directly on the separator region. This pushes the spew formed during the late stages of Phase I into the porous electrode and also into other venting paths which may exist. If the gas pressure is sustained long enough, the spew is forced ahead of the gas and out of the cell and the cell has then leaked. It will be seen then that if the amount of spew formed during Phase I is substantially reduced, then the generation of gas occuring during Phase II will have less influence upon cell leakage.

In accordance with the invention, it has been discovered that by increasing the thickness of region C, i.e. the paste separator, to a point well beyond that heretofore tried in prior art dry cells, the crystalline crust or layer which normally forms in the region B, i.e., interstices of the cathode bobbin, now surprisingly forms entirely outside of this region and wholly within the separator. Furthermore, the nature of the crust or layer is demonstratively changed to that of a soft porous layer loosely adherent to the cathode bobbin. Since the various cathode reactions remain the same, it is believed that this observed change is not the result of any chemical change in the cell reaction products but rather is the result of the differing relative lengths of the diffusion paths which are established by the increased thickness of the separator region. It may be postulated then that as a consequence of the thick paste wall, the cathode product ions are now able to diffuse into the region of the separator before the anode salts can diffuse over the now longer path through the thicker paste wall toward the cathode, hence the ions intermingle, react and precipitate in the separator region. Since the precipitate forms in the relatively open separator electrolyte environment rather than in the more restricted electrolyte-filled pores of the cathode mix cake, the resultant precipitate is relatively soft, porous, and loosely adherent to the surface of the cathode bobbin. It may also be postulated that the dilution and buffering effect of the thicker separator volume delays the onset of precipitation reactions. For this reason and because of the porous nature of the eventual precipitate, ion movement in the cell electrolyte is possible in any direction to achieve equilibrium. Then the solution volume displaced by cathode ions precipitating in the separator may counterdiffuse into the cell mix cake and as a result there is less tendency for spew forming pressure to develop. It is also found that the invention not only tends to reduce the accumulation of ions in the separator but simultaneously the free ion movement alleviates the acid effects in the anode region leading to breakdown of the paste separator as occurred in prior art cells. Another important consequence of the less hindered ion movement is better electrochemical operation of the cell electrodes and hence greater cell efficiency. As an unexpected additional benefit the porous nature of the salt precipitate allows for some of the gas formed after discharge to vent along the outside surface of the mix cake to the electrode and then out of the cell through the normally provided venting paths without carrying spew along with it.

Figure 2:
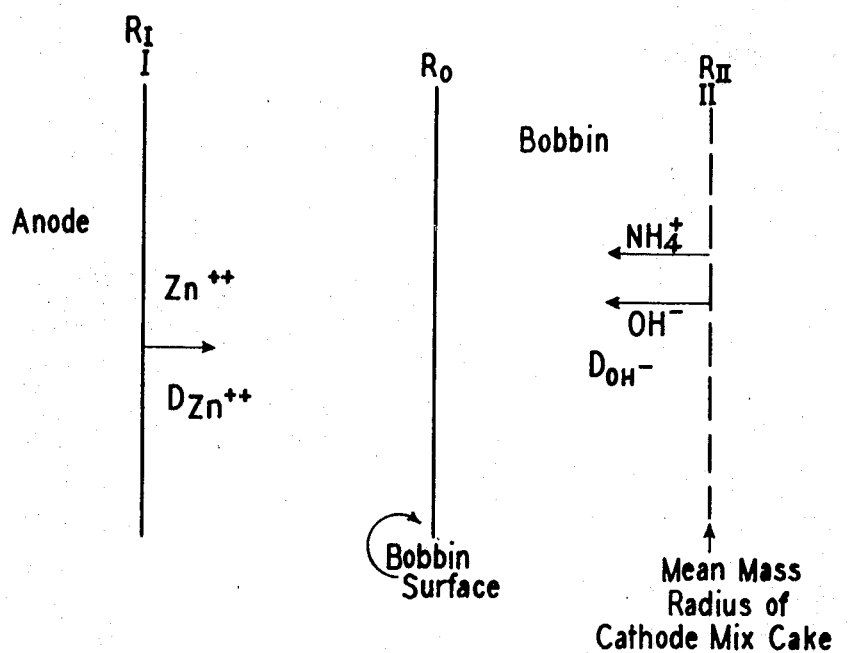
FIG. 2 is a diagram depicting a simple diffusion model representing direction of movement of some of the various ions in the cell electrolyte during discharge.

FIG. 2 shows a simple ion diffusion model upon which may be based a mathematical determination of the minimum separator paste wall thickness which may be used in the dry cell of the present invention. In FIG. 2 there is shown a line indicated by I representing the surface of the anode and a line indicated by II representing the "mean mass radius" of the cathode mix cake. The "mean mass radius" indicated by the reference letter $R_{II}$ is the radius where the mass of cathode mix cake on one side equals the mass of the cathode mix cake on the other side. Between I and II there is a line indicated by $R_o$ representing the outer surface of the cathode bobbin or the interface between the cathode mix cake and the paste separator. The arrows indicate the diffusion of zinc ion complexes from the surface of the anode and the diffusion of ammonium ions and hydroxyl ions from the interior of the cathode mix cake. The gram-moles of zinc ion complexes, i.e., $N_{Zn}$, approaching surface II per square centimeter per second can be represented by the following equation:

(Equation I) $$N_{Zn} = \frac{D_{Zn^{++}}(C_{Zn_I} - C_{Zn_{II}})}{Z}$$

wherein: $N_{Zn}$ = gram-moles zinc ion complexes approaching radius II in the cathode mix cake per cm$_2$ per second. $D_{Zn}$ = diffusion coefficient of the zinc ion complexes. Z = radial distance from anode surface I to radius II in the cathode mix cake. $C_{Zn}$ = zinc ion concentration at interface or radius, where i = I, II. Because the more slowly moving zinc ion completes are the controlling factor, only diffusion of these ions need be considered. If the ion diffusion model for a dry cell utilizing a thick paste wall in accordance with the invention is to be compared with the ion diffusion model for a dry cell of the prior art, then a ratio can be developed for Z as follows (Situation 1—Prior art practice)

$$N_{Zn_1} = \frac{D_{Zn^{++}}(C_{Zn_{1I}} - C_{Zn_{1II}})}{Z_1}$$

(Situation 2—Thick paste wall)

$$N_{Zn_2} = \frac{D_{Zn^{++}}(C_{Zn_{2I}} - C_{Zn_{2II}})}{Z_2}$$

Ratioing:

$$\frac{N_{Zn_1}}{N_{Zn_2}} = \frac{\dfrac{D_{Zn^{++}}(C_{Zn_{1I}} - C_{Zn_{1II}})}{Z_1}}{\dfrac{D_{Zn^{++}}(C_{Zn_{2I}} - C_{Zn_{2II}})}{Z_2}}$$

Completing division $$\frac{N_{Zn_1}}{N_{Zn_2}} = \frac{Z_2(C_{Zn_{1I}} - C_{Zn_{1II}})}{Z_1(C_{Zn_{2I}} - C_{Zn_{2II}})}$$

Multiplying both sides of equation by:

$$\frac{C_{Zn_{2I}} - C_{Zn_{2II}}}{C_{Zn_{1I}} - C_{Zn_{1II}}}$$

(Equation II) $$\frac{Z_2}{Z_1} = \frac{N_{Zn_1}(C_{Zn_{2I}} - C_{Zn_{2II}})}{N_{Zn_2}(C_{Zn_{1I}} - C_{Zn_{1II}})}$$

By experience the ratio of the concentration and chemical flux terms, i.e. $N_{Zn_i}$, has been found to be greater than or equal to 1.3 for the effect of the present invention to be unequivocally observed. This value has been determined using as a basis a series of standard size dry cells, i.e. D, C, AA, as provided by one manufacturer of dry cells. It will be appreciated that while the standard specifications of the United States American Standards Institute (USASI) specifies the maximum external dimensions for each size of dry cell, the internal dimensions may vary according to the practice of each manufacturer. As a basis for this calculation then, Z and consequently the value 1.3 has been determined using a standard 950 D-size and a standard 935 C-size dry cell manufactured by Union Carbide Corporation. Therefore (Equation III)

$$(Z_2/Z_1) \geq 1.3$$

$Z_1$ must be calculated for each cell size and for the standard chosen above this is calculated by: (Equation IV) $Z_1 = 0.141D + 0.002$
where D ** maximum USASI cell diameter for size under study.

Now the paste wall thickness P can be calculated as follows:
(Equation V) $P = Z - (R_o - R_{II})$
where $R_o$ represents the outside radius of the cathode bobbin.

The following are examples of the calculation of the minimum paste wall thickness P to practice the invention.

EXAMPLE 1

For a D-size cell or any of the same diameter, i.e. E, F, and G; D in Equation IV from USASI specifications is 1.343 inches.
Then:

$$Z_1 = 0.141(1.343) + 0.002$$

Or:

$$Z_1 = 0.192 \text{ inches}$$

Then substituting in Equation III:

$$(Z/0.192) \geq 1.30$$

Or:

$$Z \geq 0.250$$

A zinc can or cup inside radius must be chosen, typically near 0.613 inch:

Then:
(Equation VI) $R_{II} = R_I - Z_{min}$
$R_{II} = 0.613 - Z_{min} = 0.613 - 0.250$
Or:
$R_{II} = 0.363$ inch Next the radius $R_o$ must be calculated. To calculate $R_o$ of the cathode mix cake, a carbon electrode rod diameter must be chosen. In the industry this is 0.313 inch. Since the density of cathode mix cake is nearly uniform the mix volume on one side of $R_{II}$ will equal the mix volume on the other side of $R_{II}$. Thus where $R_c$ = carbon electrode radius and $h$ is the uniform height of the mix cake,
Then:
(Equation VII) $2\pi h(R_o^2 - R_{II}^2) = 2\pi h(R_{II}^2 - R_c^2)$
Or rearranging and dividing by $2\pi h$.
(Equation VIII) $R_o^2 = 2R_{II}^2 - R_c^2$
Using the value of $R_{II}$ obtained from above,
Then:
$R_o^2 = 2(0.363)^2 - 0.024$
$= 0.264 - 0.024$
$= 0.240$ inches²
$R_o = 0.490$ inches
Bobbin diameter $= 2R_o = 0.980$ inch
Thus the minimum paste thickness would be from Equation V:
$P_{min.} = 0.250 - (0.490 - 0.363)$
$P_{min.} = 0.123$ inch (typical present art <0.090 inch)

EXAMPLE 2

For a C-size cell, D in Equation IV from USASI specifications is 1.031 inch.
Then:
$Z_1 = 0.141(1.031) + 0.002$
Or:
$Z_1 = 0.148$ inches
From Equation III:
$Z\ 0.193$ inches The carbon electrode rod in a C-size cell is typically 0.239 inch diameter and the zinc can inside radius is 0.461 inch.
Then from Equation VI:
$R_{II} = R_I - Z_{min}$
Or:
$R_{II} = 0.461 - 0.193 = 0.268$
From Equation VIII:
$R_o = 2R_{II}^2 - R_c^2$ $$R_o^2 = 2(.268)^2 - \left(\frac{.239}{2}\right)^2$$

$R_o^2 = 0.144 - 0.0142$
$R_o^2 = 0.130$
$R_o = 0.360$
Bobbin diameter $= 2R_o = 0.720$ inch.
From Equation V:
$P_{min.} = Z_{min.} - (R_o - R_{II})$
$P_{min.} = 0.193 - (0.360 - 0.268)$
$P_{min.} = 0.101$ inch (Typical art <0.070 inch)

To demonstrate the effectiveness of the present invention, a series of test were conducted using D-size dry cells of the same age and construction except that the cells were made in separate groups each employing a different paste separator wall thickness. The cells were constructed with the same depolarizer mix and paste formulation and the height of both the cathode bobbin and paste separator was the same in all the cells. A large air space was provided in all the cells in order to confine any spew formed on discharge. The cells were finished with a conventional type of outer container including a tubular jacket surrounding the zinc cup or can and having metallic top and bottom closures locked thereto, the tubular jacket being of the nonabsorbent type in order to prevent spew from soaking into the jacket. The usual subseals used in conventional dry cells in order to inhibit movement of the spew were eliminated and the centering washer used to hold the cathode bobbin in place during assembly was modified in order to permit the free flow of spew formed on discharge.

The cells in the test were divided into four groups, each group having a thicker paste wall separator for purposes of the demonstration. The paste wall thickness for each group of cells ranged from a conventional thickness of 0.071 inch as used in the standard 950 D-size dry cell manufactured by Union Carbide Corporation to a wall thickness of 0.276 inch. The paste wall thickness for each group of cells is given below.

| Group | Paste Wall Thickness (in.) |
| --- | --- |
| I | 0.071 |
| II | 0.126 |
| III | 0.176 |
| IV | 0.276 |

In the test, all the cells were aged for one week at ambient room temperature in accordance with the usual procedure. The cells were then checked for low volts and amps in order to eliminate those cells with any assembly defects from the test. Five cells of each paste wall thickness were then selected at random from the groups of cells and placed on short circuit test for one day. This was done in air at ambient room temperature. The cells were taken off test after one day and immediately opened by removing the top closure from the cells. The cells were then compared to check for volume and liquidity of the spew formed on discharge. The cells within each group looked alike, therefore one cell from each group was then chosen and placed on a laboratory rig which was adapted to be tipped on an inclined plane in order to invert the open end of the cells. Spew collector troughs approximately 9 inches in length and closed at the lower end were placed under each cell so that the spew could be observed and collected. The rig was then tipped on the inclined plane and the amount and liquidity of the spew collected was visually observed.

After 5 hours the collector troughs were removed and weighed and compared to their initial weights to determine the total amount of spew collected. Table I below gives the paste weights and spew weights for each of the cells.

TABLE I

Effect of Increasing Paste Wall Thickness on Spew Formation

| Group | Paste Wall Thickness (Inch) | Paste Weight (Grams) | Spew Weight (Grams) |
| --- | --- | --- | --- |
| I | 0.071* | 7.5 | 4.4 |
| II | 0.126 | 13.8 | 2.2 |
| III | 0.176 | 18.1 | 0.0 |
| IV | 0.276 | 25.3 | 0.0 |

*Conventional 950 D-size paste wall thickness.

Table I demonstratively shows the effect of increasing the paste wall thickness on spew formation in a dry cell. The cell representing Group I having a conventional paste wall thickness of 0.071 inch showed the most amount of spew formation while the cell representing Group II having a paste wall thickness of 0.126 inch showed only half as much spew formed during the test. The cells of Groups III and IV did not release any spew into the collector troughs.

The visual observations made at various intervals during the test may be summarized as follows.

Group I—The cell representing Group I having a paste wall thickness of 0.071 inch completely filled the air space at the top of the cell with a thin water spew after one day on test. The spew was the least viscous and flowed the fastest into and along the collector trough.

Group II—The cell representing Group II having a paste wall thickness of 0.126 inch formed spew which was less in quantity and more viscous than that of the Group I cell and took 30 minutes to flow down the 9-inch length of the collector trough whereas the cell of Group I took only 1 minute.

Group III—The cell representing Group III having a paste wall thickness of 0.176 inch showed only a small amount of spew formation. The spew did not flow out of the cell into the collector trough during the entire period of 5 hours.

Group IV—The cell representing Group IV having a paste wall thickness of 0.176 inch did not exhibit any spew formation at all. It appeared to be a fresh cell which had not been placed on discharge. Measurement of the voltage and amperage showed it to be discharged.

As already indicated, the provision of the thick wall paste separator in the dry cell of the present invention is made at the expense of the cathode bobbin diameter and consequently some active cathode depolarizer material is removed. Thus, one would ordinarily expect that the output of the present dry cell on normal drains would be considerably lowered. However, it has been found that while there is in fact a reduction in cell output using a thick wall paste separator, surprisingly this reduction in cell output may be less than half that expected on the basis of the reduction in weight of active cathode depolarizer material. Illustratively, it was found in the above described demonstration that where the paste wall thickness had been increased from that of the standard D-size dry cell of Group I to a thickness of 0.126 inch representing a 20 percent reduction in cathode depolarizer material only a 7 percent reduction in cell output resulted on 2.25 ohm light industrial flashlight (L.I.F.) test.

This surprising observation may be explained by a consideration of the following principal phenomena: The watt output of the cell is the sum of the watt output of each electrode. The decreased amount of manganese dioxide depolarizer material does in fact result in less watt output from the cathode in an amount roughly proportional to the amount of the cathode depolarizer material removed. However, the watt output of the zinc anode is measurably improved by the presence of more electrolyte adjacent to the anode surfaces so that the sum of the watt output of the two electrodes is not decreased as much as would be expected if only the cathode mix cake were considered. Stated another way, due to the increased efficiency of the zinc anode, the efficiency of the use of the manganese dioxide appears to increase in the sense that less manganese dioxide is required to operate the dry cell at a useful voltage.

In order to demonstrate the increase in useful efficiency of the manganese dioxide depolarizer material in dry cells utilizing the thick wall paste separator of the present invention, another series of tests were conducted. In these tests, three groups of cells were made of identically the same construction as in the previous demonstration except that a different paste wall thickness was used for the cells in each group. The total weight of the manganese dioxide depolarizer material for each group of cells was measured, the total weight being measured in grams and was less for those cells using a thick wall paste separator. The cells were subjected to a standard 1¼ ohm L.I.F. test to a cutoff voltage of 0.650 volts. The total service in minutes and ampere-hours to cutoff voltage was then determined for each of the cells.

Useful efficiency of the cathode mix can be expressed in terms of either ampere-hours output per gram or minutes service output per gram of manganese dioxide to the chosen cutoff. Based on the weight of the manganese dioxide per cell and total minutes service on drain obtained in the test, the value of useful efficiency based on either criteria was then determined. Table II below summarizes the test and shows the obtained values for the useful efficiency of the cathode mix.

TABLE II.—USEFUL EFFICIENCY OF THE CATHODE MIX

| Paste wall thickness (inch) | Grams, $MnO_2$/ cell | Minutes service [1] | Amp-hours to 0.65 v. | Minutes/ grams $MnO_2$ | Amp-hours/ gram $MnO_2$ |
|---|---|---|---|---|---|
| 0.076 | 23.5 | 538 | 3.60 | 22.9 | .153 |
| 0.126 | 19.4 | 475 | 3.17 | 24.5 | .163 |
| 0.156 | 16.7 | 424 | 2.83 | 25.4 | .169 |

[1] Average on 2-1/4 ohm LIF.

Figure 3:
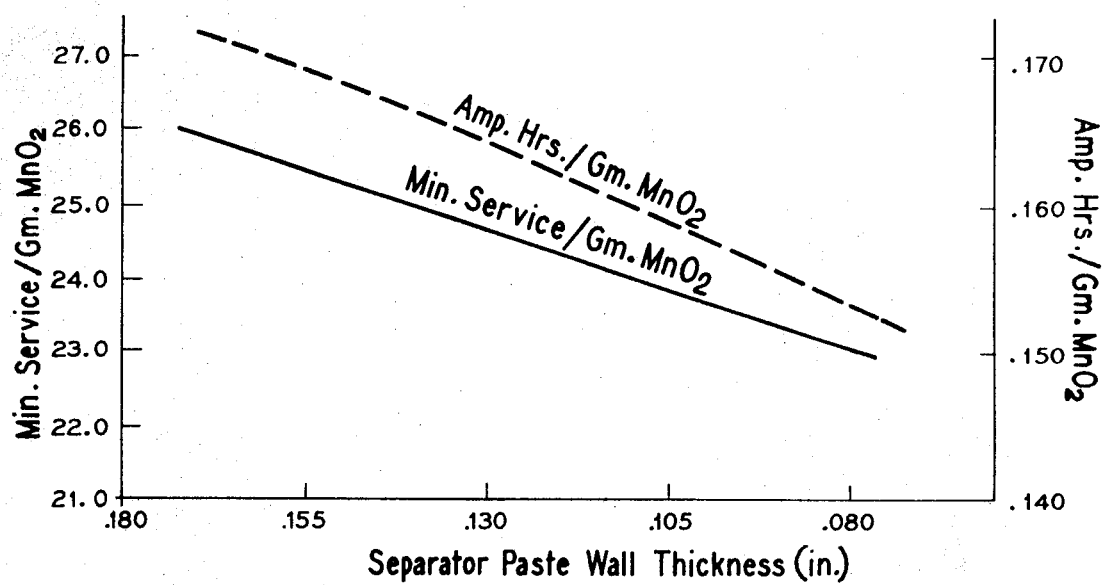
FIG. 3 is a graph showing the relationship between observed cell efficiency and paste wall thickness in a Leclanche D-size dry cell.

It will be seen from the above table that based on either criteria, the useful efficiency of the cathode mix increased in those cells having a thick wall paste separator. FIG. 3 shows graphically the results of this test.

It should be mentioned that although the use of a thick wall paste separator in dry cells of the present invention results in a loss of cell output, this loss is rather small and can be readily restored in any one of several different ways. Since there is less spew formed on discharge of the dry cell, a large air space above the cathode bobbin is no longer required and this space can now be used to accommodate more cathode mix in the cell. Thus, the mix height of the cathode bobbin can be increased beyond that of conventional prior art dry cells employing the same size zinc can in order to restore as much manganese dioxide depolarizer as may be required. Another way to restore the cell output is to reformulate the cathode mix such as by using a higher grade or more active manganese dioxide ore as the entire depolarizer material or a portion thereof. The ratio of manganese dioxide to conductive material e.g. carbon, used in the mix can also be increased.

Thus, it will be seen that the present invention significantly improves the leakage resistance of a Leclanche dry cell by substantially reducing the formation of spew which is the primary cause of leakage. This is accomplished surprisingly by increasing the wall thickness of the paste separator beyond that heretofore thought feasible by those skilled in the art but without at the same time seriously reducing the service life of the cell. It will be understood that in a practical embodiment of the dry cell of the present invention, the cell proper will be encased within an outer container of a conventional construction in order to accommodate any spew that may form on discharge.

What is claimed is:

1. A Leclanche dry cell comprising in combination: a cylindrical consumable zinc anode, a cathode bobbin of cylindrical form disposed within but separated from the surfaces of said zinc anode, said cathode bobbin including a porous cathode mix cake comprising manganese dioxide as the active depolarizer material formed around a central electrode rod, and a gelatinous paste separator containing an electrolyte consisting essentially of an aqueous solution of ammonium chloride and zinc chloride interposed in the space between said zinc anode and said cathode bobbin and being in contact with the surfaces of said zinc anode and said cathode mix cake, said paste separator having a minimum wall thickness as determined by the following equations:

1. $P=Z-(R_o-R_{II})$ wherein $P$ = minimum wall thickness of said paste separator;
  $Z$ = radial distance from the anode surface to the mean mass radius of said cathode mix cake;
  $R_o$ = outside radius of said cathode mix cake; and
  $R_{II}$ = the mean mass radius of said cathode mix cake;
2. $Z=1.3(0.141D+0.002)$ wherein $D$ = maximum USASI cell diameter for standard dry cell;
3. $R_{II}=R_I-Z$ wherein $R_I$ = inside radius of zinc anode; and
4. $R_o=\sqrt{2 R_{II}^2-R_c^2}$ wherein $R_c$ = radius of central electrode rod.

2. A D-size Leclanche dry cell in accordance with claim 1 wherein the minimum wall thickness of said gelatinous paste separator is 0.123 inch.

3. A C-size Leclanche dry cell in accordance with claim 1 wherein the minimum wall thickness of said gelatinous paste separator is 0.101 inch.

* * * * *